United States Patent [19]

Ross

[11] 4,066,154
[45] Jan. 3, 1978

[54] SELF-ADJUSTING BIKE BRAKE OPERATING MECHANISM

[75] Inventor: Haldon Ross, Olney, Ill.

[73] Assignee: AMF Incorporated, White Plains, N.Y.

[21] Appl. No.: 743,726

[22] Filed: Nov. 22, 1976

[51] Int. Cl.² ............................................. B62L 1/00
[52] U.S. Cl. .............................. 188/196 BA; 74/489; 74/501.5 R; 188/24; 192/111 A
[58] Field of Search .......................... 188/2 D, 24–27, 188/196 R, 196 BA, 196 B, 79.5 K; 192/12 B, 111 A; 74/488, 489, 435, 501.5 R

[56] References Cited

U.S. PATENT DOCUMENTS

| 711,443 | 10/1902 | Sharp | 74/489 |
|---|---|---|---|
| 3,546,960 | 12/1970 | Masuda | 74/489 |
| 3,926,284 | 12/1975 | Notario | 188/79.5 K X |

*Primary Examiner*—Trygve M. Blix
*Assistant Examiner*—Douglas C. Butler
*Attorney, Agent, or Firm*—George W. Price; Walter Lewis

[57] ABSTRACT

The handle mechanism for operating the bike brake cable has a ratchet-pawl controlled cable drum built into it for automatically adjusting for brake shoe wear.

4 Claims, 3 Drawing Figures

SELF-ADJUSTING BIKE BRAKE OPERATING MECHANISM

This invention relates to an improvement in manually operated bicycle or motorcycle brakes, and more particularly, to a self-adjusting bike brake operating mechanism.

As is well-known to those skilled in the art, as the brake shoes of a bicycle brake become worn, the brake has to be periodically adjusted by changing the connection of the brake cable to the brake calipers. In the invention the adjustment for brake shoe wear is automatically accomplished at the brake handle operating mechanism.

The invention will be illustrated in connection with caliper-type bicycle brakes. However, the invention is also applicable to motorcycle and other type cable brakes which are controlled by a handle operating mechanism.

In the single sheet of drawing.

Figure 3:
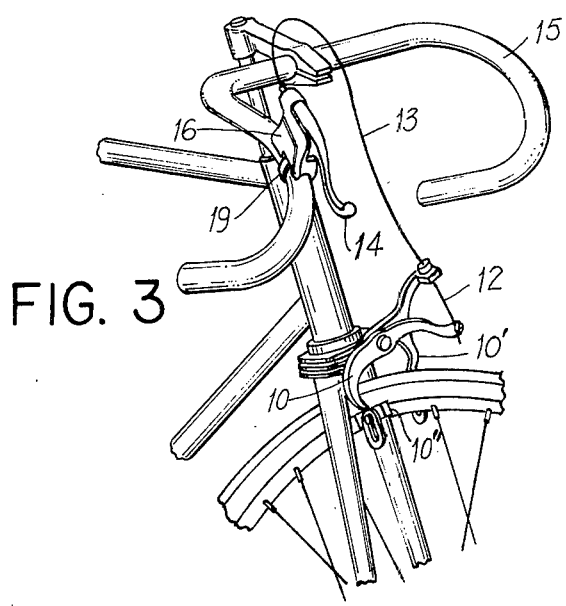
FIG. 3 is an illustration of the mechanism of FIGS. 1 and 2 in connection with caliper-type brakes for the wheel rim of a bicycle.

Referring now particularly to the various Figures of the drawings, shown therein is a pair of calipers 10, 10' (see FIG. 3) which at their lower ends have a pair of brake shoe pads 10" for engaging the wheel rim 11. The calipers 10, 10' are urged apart by a not shown spring connected thereto, and they are moved towards each other by a cable 12 and sheath 13 therefor connected respectively to the calipers 10, 10'. The cable 12 in turn is actuated by the brake handle 14 mounted on the handlebar 15. Although the invention is illustrated with respect to the front wheel, it will be obvious that it is also applicable to the rear wheel.

Figure 1:
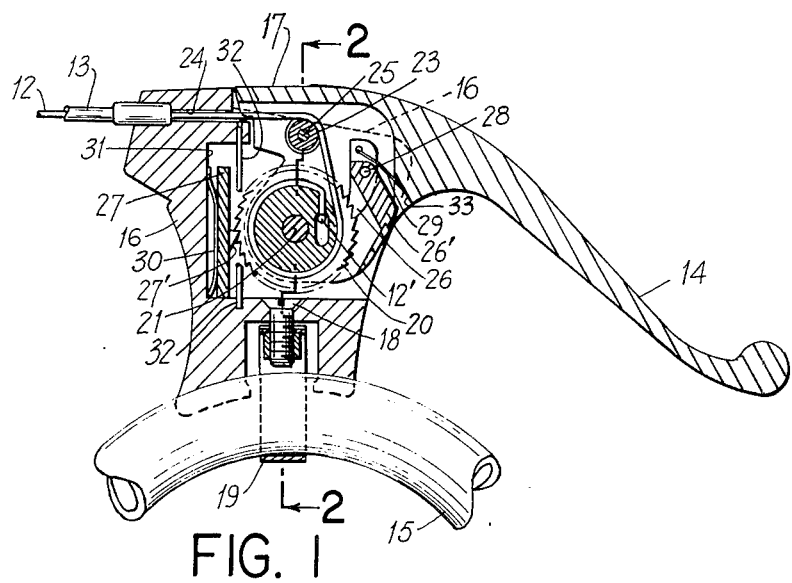
FIG. 1 is a broken away side view of the invention.
Figure 2:
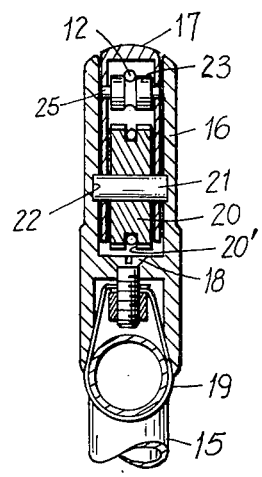
FIG. 2 is a sectional view taken on the section line 2—2 of FIG. 1.

Referring now to FIGS. 1 and 2, the cable operating mechanism is housed within two enclosures 16 and 17. The bottom of enclosure 16 is clamped to the bike handle 15 by a stud and clamp strap 18 and 19. The enclosure 17 is an integral portion of the handle 14 and is nested inside the enclosure 16.

The enclosures 16 and 17 are generally flat and somewhat rectangular in shape. Enclosure 16 is open at its top and right-hand end (when viewing FIG. 1), whereas enclosure 17 is closed at its top and right-hand end. So, when part 17 is nested into part 16, the cable operating mechanism is completely enclosed.

As seen also from FIG. 2, a rotatable ratchet wheel 20 is positioned inside the enclosure 17 on a pin 21 which protrudes through the side walls of part 17 into the side walls of part 16. The outermost ends of pin 21 are located in a pair of side wall notches 22. These notches 22 extend laterally from about the center of the side walls of part 16 to the right-hand end thereof. That is to say, they are open at their right-hand ends and blind or closed at the center of part 16. Thus, in order to assemble part 17 into part 16, the pin 21 is positioned into the notches 22 and part 17 is then slid into part 16 until the pin 21 bottoms against the closed ends of the notches 22. With this arrangement of the parts it should be clear that the part 17 and its handle 14 is thus also pivotal or rotatable about the same axis as the wheel 20; that is to say, on the pin 21.

The cable 12 is periodically wound on the wheel 20 as brake shoe wear occurs. At its inner end 12' cable 12 is anchored to the wheel 20, and it is wound on the wheel 20 in the central groove 20' thereof. From the groove 20' the cable progresses about a roller 23 and then out of the mechanism through an aperture 24 formed in part 16. The sheath 13 for the cable is dead ended in the aperture 24. The roller 23 is mounted in part 17 on a pin 25.

Two spring biased pawls 26 and 27 are provided for the ratchet wheel 20 which, of course, is toothed. The right-hand one 26 is mounted in part 17 on a pin 28, and the left-hand one 27 is a slide block held captive in part 16, but capable of limited up and down movement. The bias for pivoted pawl 26 is spring 29 and the bias for block 27 is a leaf spring 30.

Block 27 is trapped in a chamber 31 in part 16 by a pin 32 which extends thereacross between the top and bottom of part 16. The block has a tooth 27' which engages the teeth on wheel 20, and pawl 26 likewise engages the wheel 20. The block 27 is backed up by the spring 30. Although broken away at its center for purposes of clarity, actually the pin 32 is continuous from top to bottom and extends across the tooth 27' through a not shown central notch therein.

Now for a description of the operation of the device: In order to apply the brake, the handle 14 is pushed down or squeezed toward the handlebar 15. When this is done, the part 17 and wheel 20 rotate in unison on the pin 21 in a clockwise direction since the pawl 26 is engaged with the wheel 20. As the wheel 20 turns, the cable is wound thereon to pull it to apply the caliper brake 10, 10', 10" to the wheel rim 11. When the handle 14 is released, a not shown separating spring at the calipers 10, 10' pulls the cable 12 in the opposite direction to return the handle 14 and wheel 20 to start position.

When the wheel 20 turns clockwise and then counterclockwise, the block 27 moves up and down respectively since its tooth 27' is engaged with the wheel 20. If the brake shoes 10" are worn, so that by the time the block 27 abuts the top of chamber 31, the shoes 10" still are not in engagement with the rim 11, the wheel 20 will continue to be turned clockwise by handle 14 by ratcheting over the tooth 27' inasmuch as the spring 30 will buckle. After the cable 12 can be wound no more because the brake shoes 10" are engaged with the rim 11, if the handle 14 is then released, the wheel 20 will not unwind for the same distance as it was wound, but somewhat less than that, since the block 27 will bottom on the bottom of chamber 31 to lock the wheel 27 from rotating back all the way to its start position. The handle 14, of course, will rotate back all the way to start position with respect to the wheel 20 since the pivoted pawl spring 29 forces it to do that, and in that direction of handle movement the pivoted pawl 26 is free to ratchet back over the wheel 20. Thus, since the wheel 20 has been advanced an extra amount to take up the slack in the cable 12 because of brake shoe wear, the next time the handle 14 is squeezed the brake shoes 10" will engage the rim 11 within the lift stroke of block 27 and without the wheel 20 needing to override the tooth 27'.

Thus, the invention provides an automatic or self-adjusting feature for the brakes in the handle or cable operating mechanism therefor. In addition, the mechanism is relatively low in cost, has few parts, and is easy to assemble and service. Essentially, there are two subassemblies. One is the part 16, the left-hand pawl 27 and clamp 19; and the other is the part 17, the right-hand pawl 26, guide 23 and wheel 20; and the springs and pins for the respective parts of each subassembly. The subassembly comprisings parts 17, etc., are nested in the other subassembly 16, etc., and this is simply by sliding part 17 into part 16. The two subassemblies are held in nested position simply by the brake spring tension on the cable 12. In order to disassemble the parts all that is necessary is to move the pawl 26 to the right and the pawl 27 to the left so that the wheel 20 is free to unwind the cable 12. Suitable apertures are provided in the enclosures 16 and 17 to do that; one 33 adjacent a finger 26' on the pawl 26; and the other, not shown, but in one of the side walls of part 16, adjacent the block 27. When the pawls 26 and 27 are freed from the wheel 20, it plays out the wound cable 12 so that part 17 can be moved to the right by sliding the ends of pin 21 in the notches 22 to the right until completely free therefrom. To install the mechanism the cable 12 is brought out from the wheel 20 over roller 23 and through the aperture 24 and sheath 13 and then fastened to the caliper arm 10 whereas the other end of the sheath 13 is dead ended to the caliper arm 10'. At this stage the wheel 20 can be finger turned by manipulating its exposed part until some of the cable 12 is wound on the wheel 20 and then part 17 is placed in part 16 and the handle 14 ratcheted until the cable 12 is taut enough for a brake application.

I claim:

1. A self-adjusting manual bike brake cable operating mechanism, comprising a housing for said brake cable operating mechanism mounted to a handlebar portion of a bike, said housing comprising a generally flat and rectangular shaped enclosure open at its top and one of its ends, means at the bottom of said enclosure for clamping the same to said handlebar portion, another generally flat enclosure having a handle member affixed thereto, said another enclosure being positioned within said first mentioned enclosure to close its open top and end, a ratchet wheel rotatably mounted inside said another enclosure, said another enclosure being rotatably mounted inside said first enclosure on the same axis as said wheel, a brake operating cable wound on said wheel, a spring biased pawl mounted in said another enclosure for engagement with said wheel whereby said another enclosure and wheel are rotated in unison in one direction to wind said cable on said wheel when said handle is operated, and another spring biased pawl mounted in said first enclosure for engagement with said wheel to limit unwinding of said cable upon release of said handle.

2. In a self-adjusting manual bike brake cable operating mechanism as in claim 1, wherein said another spring biased pawl comprises a limited movement slide block captive mounted in said first enclosure, a tooth on said block in engagement with said wheel, and a leaf spring behind said block whereby said wheel can override said tooth by depressing said leaf spring when said wheel is turned by said handle in a direction to wind said cable.

3. In a brake cable operating mechanism as in claim 2, a guide roller mounted in said another enclosure for said cable, said cable extending out from said mechanism through an aperture in said first enclosure; and said another enclosure, wheel, first spring biased pawl and roller being removable as a self-contained subassembly from within said first enclosure; and said first enclosure, clamping means and another spring biased pawl comprising another self-contained subassembly.

4. In a brake cable operating mechanism as in claim 3, said wheel being rotatable on a pin extending through the opposite side walls of said another enclosure, the outermost ends of said pin being positioned in a pair of interior laterally extending grooves formed in the opposite side walls of said first enclosure, the inner ends of said grooves being closed and the outer ends being open whereby said first-mentioned self-contained subassembly is positioned in said another self-contained subassembly by positioning said pin in said grooves and sliding the first subassembly into the other subassembly until the outermost ends of said pin bottom on the closed ends of said grooves, and the brake release tension on said cable operating to retain said first subassembly nested in said other subassembly.

* * * * *